United States Patent
Bhola et al.

(10) Patent No.: US 8,392,961 B2
(45) Date of Patent: Mar. 5, 2013

(54) DYNAMIC ACCESS CONTROL IN A CONTENT-BASED PUBLISH/SUBSCRIBE SYSTEM WITH DELIVERY GUARANTEES

(75) Inventors: Sumeer K. Bhola, New York, NY (US); Daniel C. Sturman, Los Altos, CA (US); Yuanyuan Zhao, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 884 days.

(21) Appl. No.: 12/137,147

(22) Filed: Jun. 11, 2008

(65) Prior Publication Data

US 2008/0244696 A1 Oct. 2, 2008

Related U.S. Application Data

(63) Continuation of application No. 11/402,685, filed on Apr. 12, 2006, now abandoned.

(51) Int. Cl.
*G06F 21/00* (2006.01)
(52) U.S. Cl. ............ 726/1; 380/277; 709/200; 709/225; 370/342; 455/410
(58) Field of Classification Search .................. 380/277, 380/25; 370/342; 379/15, 207; 455/410; 709/200
See application file for complete search history.

(56) References Cited

U.S. PATENT DOCUMENTS

| | | | | |
|---|---|---|---|---|
| 6,047,045 A * | 4/2000 | Bauer et al. | ................. | 379/26.01 |
| 6,158,007 A * | 12/2000 | Moreh et al. | ....................... | 726/1 |
| 6,334,151 B1 * | 12/2001 | Bolam et al. | .................. | 709/225 |
| 6,625,734 B1 | 9/2003 | Marvit et al. | | |
| 6,643,682 B1 * | 11/2003 | Todd et al. | ..................... | 709/202 |
| 6,662,206 B1 * | 12/2003 | Banavar et al. | ............... | 709/201 |
| 6,769,032 B1 | 7/2004 | Katiyar et al. | | |
| 2002/0184374 A1 | 12/2002 | Morikawa | | |
| 2003/0044017 A1 * | 3/2003 | Briscoe | ........................ | 380/277 |
| 2003/0110373 A1 | 6/2003 | Champion | | |
| 2003/0115317 A1 * | 6/2003 | Hickson et al. | ............... | 709/224 |
| 2004/0003064 A1 * | 1/2004 | Astley et al. | ................... | 709/223 |
| 2004/0111612 A1 | 6/2004 | Choi et al. | | |
| 2004/0267779 A1 * | 12/2004 | Carter et al. | .................. | 707/100 |
| 2005/0256826 A1 * | 11/2005 | Hambrick et al. | ................ | 707/1 |

(Continued)

FOREIGN PATENT DOCUMENTS

WO WO 03/040898 5/2003

OTHER PUBLICATIONS

Internet Messaging Security With Worldtalk; New Product Allows for Security and Management Over, Internet Messages., Business Wire, p. 06170098, Jun. 17, 1996.*

(Continued)

*Primary Examiner* — Tien Nguyen
(74) *Attorney, Agent, or Firm* — Louis J. Percello; Ryan, Mason & Lewis, LLP

(57) ABSTRACT

Improved access control techniques for distributed messaging systems such as content-based publish/subscribe systems are disclosed. For example, a method for providing access control in a content-based publish/subscribe system, wherein messages are delivered from publishing clients to subscribing clients via a plurality of brokers, includes the following steps/operations. One or more changes to an access control policy are specified. An access control version identifier is associated to the one or more changes. The one or more changes are sent to one or more brokers of the plurality of brokers that have a publishing client or a subscribing client associated therewith that is affected by the one or more changes. The access control version identifier associated with the one or more changes is sent to each of the plurality of brokers.

20 Claims, 9 Drawing Sheets

U.S. PATENT DOCUMENTS

2006/0072532 A1* 4/2006 Dorenbosch et al. ......... 370/342
2006/0094400 A1* 5/2006 Beachem et al. ............. 455/410

OTHER PUBLICATIONS

Deliver the Message.(effective communications), Sutherland, Julia, Best's Review—Life-Health Insurance Edition , v 100 , n. 3 , p. 74, Jul. 1999.*

Industry At Large.(Company overview) Via Satellite , v 21 , n. 5 , p. NA, May 1 , 2006, ISSN: ISSN: 1041-0643.*

Tumbleweed MailGate Email Firewall 6.2 Adds Support for OpenPGP Encryption; Enterprise-Class Deployments Also Improved with New Support for Multiple LDAP Directories and Enhanced High Availability and Failover Options, Business Wire , p. NA, Oct. 11, 2005.*

U.S. Appl. No. 10/177,474, filed Jun. 21, 2002, S.K. Bhola et al.

Y. Zhao et al., "A General Algorithmic Model for Subscription Propagation and Content-Based Routing with Delivery Guarantees," RC23669, IBM Research, pp. 1-14, 2005.

Y. Zhao et al., "Subscription Propagation in Highly-available Publish/Subscribe Middleware," ACM/IFIP/USENIX $5^{th}$ International Middleware Conference, 20 pages, 2005.

Y. Yan et al., "Implementing a Prototype of the Security Framework for Distributed Brokering Systems," Proceedings of the International Conference on Security and Management (SAM'03), 7 pages, Jun. 2003.

J. Bacon et al., "Securing Publish/Subscribe for Multi-Domain Systems," Proceedings of the 6th International Middleware Conference (MW'05), 20 pages, Nov. 2005.

L. Opyrchal et al., "Secure Distribution of Events in Content-Based Publish Subscribe Systems," Proceedings of the 10th Usenix Security Symposium, Aug. 2001.

P. Judge et al., "Security Issues and Solutions in Multicast Content Distribution: A Survey," IEEE, Network, pp. 2-8, Jan./Feb. 2003.

P.S. Kruus, "A Survey of Mutlicast Security Issues and Architectures," 21st National Information Systems Security Conference, 13 pages, Oct. 1998.

S. Rafaeli et al., "A Survey of Key Management for Secure Group Communication,"ACM Computing Surveys, vol. 35, No. 3, pp. 309-329, Sep. 2003.

J-C. Birget et al., "Hierarchy-Based Access Control in Distributed Environments," IEEE ICC, pp. 229-233, 2001.

Y. Sun et al., "Scalable Hierarchical Access Control in Secure Group Communications," Proceedings of the 23rd Conference of the IEEE Communications Society, 11 pages, 2004.

C. Wang et al., "Security Issues and Requirements for Internet-Scale Publish-Subscribe Systems," Proceedings of the 35th Hawaii International Conference on System Sciences, vol. 9, pp. 1-8, 2002.

M Abadi et al., "Secure Circuit Evaluation, A Protocol Based on Hiding Information from an Oracle," Journal of Cryptology vol. 2, pp. 1-12, 1990.

A. Belokosztolszki et al., "Role-Based Access Control for Publish/Subscribe Middleware Architectures," ACM Second International Workshop on Distributed Event-Based Systems (DEB'03) pp. 1-8, 2003.

D. Ferraiolo et al., "Role-Based Access Control," Proceedings of 15th National Computer Security Conference, pp. 1-11, 1992.

J. Bacon et al., "A Model of OASIS Role-Based Access Control and Its Support for Active Security," ACM Transactions on Information ad System Security, vol. 5, No. 4, pp. 492-540, Nov. 2002.

Z. Miklós, "Towards an Access Control Mechanism for Wide-Area Publish/Subscribe Systems," 22nd International Conference on Distributed Computing Systems Workshops (ICDCSW '02), pp. 1-6, 2002.

M. Srivatsa et al., "Securing Publish-Subscribe Overlay Services with EventGuard," Proceedings of the 12th ACM Conference on Computer and Communications Security, pp. 1-16, 2005.

* cited by examiner

SHB PROCESSING UPON RECEIVING INFORMATION ON A NEW VERSION OF ACCESS CONTROL

SHB PROCESSING UPON RECEIVING A NEW CLIENT SUBSCRIPTION

PHB PROCESSING UPON RECEIVING INFORMATION ON A NEW VERSION OF ACCESS CONTROL

PHB PROCESSING UPON RECEIVING A NEW DATA MESSAGE

IB PROCESSING UPON RECEIVING A DATA MESSAGE

DYNAMIC ACCESS CONTROL IN A CONTENT-BASED PUBLISH/SUBSCRIBE SYSTEM WITH DELIVERY GUARANTEES

CROSS REFERENCE TO RELATED APPLICATION

This application is a continuation of pending U.S. application Ser. No. 11/402,685 filed on Apr. 12, 2006, the disclosure of which is incorporated herein by reference.

FIELD OF THE INVENTION

The present application generally relates to distributed messaging systems and, more particularly to access control techniques in such systems.

BACKGROUND OF THE INVENTION

A popular approach employed in distributed messaging systems for use with asynchronous distributed applications is the content-based publish/subscribe (pub/sub) messaging approach. A content-based pub/sub system includes publishing client devices or machines ("publishers") that generate messages and subscribing client devices or machines ("subscribers") that register interest in messages matching the predicate/Boolean filter specified in their subscription. The system ensures timely delivery of published messages to all interested subscribers, and typically contains routing broker devices or machines ("brokers") for this purpose. Thus, in the content-based pub/sub paradigm, the information providers (i.e., publishers) and consumers (i.e., subscribers) are decoupled, since publishers need not be aware of which subscribers receive their messages, and subscribers need not be aware of the sources of the messages they receive.

For many applications, content-based pub/sub systems are required to provide strong service guarantees (such as reliable, in-order, gapless delivery), high scalability to support large number of clients, high service availability and high performance/throughput. In order to achieve these goals, typical systems: (1) propagate and consolidate subscription information toward publishers; (2) using the subscription information, perform content filtering to achieve good network bandwidth utilization and scalability; and (3) and utilize redundant network paths for high service availability.

An important but often ignored issue that can hinder the commercial adoption of pub/sub systems is security assurance provided to applications. In particular, applications want to ensure the confidentiality, integrity and authenticity of events as they are disseminated. It is often required that only trusted sources should be allowed to publish events, and that information/events should only be distributed to authorized or paying subscribers. A closely related problem is accounting and auditing which enables the billing of subscribers based on usage.

This issue of access control in pub/sub systems is further complicated by the issue of changing access control policies. One problem associated with a change in the access control policy is the disruption in pub/sub service that occurs when the change is being made.

Accordingly, there is a need for improved access control techniques for distributed messaging systems which are able to efficiently and effectively account for access control policy changes.

SUMMARY OF THE INVENTION

Principles of the invention provide improved access control techniques for distributed messaging systems such as content-based publish/subscribe systems.

For example, in one aspect of the invention, a method for providing access control in a content-based publish/subscribe system, wherein messages are delivered from publishing clients to subscribing clients via a plurality of brokers, includes the following steps/operations. One or more changes to an access control policy are specified. An access control version identifier is associated to the one or more changes. The one or more changes are sent to one or more brokers of the plurality of brokers that have a publishing client or a subscribing client associated therewith that is affected by the one or more changes. The access control version identifier associated with the one or more changes is sent to each of the plurality of brokers. In one embodiment, the access control version identifier is a number.

Each of the one or more changes to the existing access control policy may be stored and implemented in the system as a batch, having the access control version identifier associated therewith, so as to uniquely identify the one or more changes from one or more previous changes to the existing access control policy of the system.

Each of the plurality of brokers may be at least one of a publisher hosting broker (PHB), a subscriber hosting broker (SHB) and an intermediate broker (IB), and the above specifying, associating and sending steps are performed in accordance with a security administrator.

The security administrator may send the one or more changes and the associated access control version identifier to PHBs and SHBs that have a publishing client or a subscribing client associated therewith that is affected by the one or more changes.

An SHB, upon receipt of the one or more changes, may compute a restricted subscription for an affected client. The SHB may then send the restricted subscription along with the access control number to one or more other brokers.

A PHB may, upon receipt of the one or more changes, apply the one or more changes to the access control policy to obtain the latest publishing rights and the access control version identifier. Further, a PHB may, upon receipt of a data message to be published, apply the latest publishing rights to the message. The PHB may then send the data message along with the access control number to one or more other brokers.

An IB may maintain a control version vector.

In another aspect of the invention, a content-based publish/subscribe system for providing message delivery from a publishing client to a subscribing client includes a plurality of brokers operatively coupled to one another via a network, each of the brokers being configured as at least one of a publisher hosting broker (PHB), a subscriber hosting broker (SHB) and an intermediate broker (IB). The system also includes at least one administrator being operatively coupled to at least a portion of the plurality of brokers, and being configured to store and update at least one access control policy within the system. At least a portion of the plurality of brokers and the at least one administrator are configured to implement a change to the access control policy within the system by including an access control version identifier with one or more messages sent therebetween, wherein the access control identifier uniquely identifies the access control policy that is in effect, such that the change in the access control policy deterministically and uniformly applies to publishing clients and subscribing clients associated with one or more principals affected by the change in the access control policy.

Advantageously, the system may thereby guarantee deterministic and uniform access control semantics to all subscribers on behalf of the same principals in the system, even when a crash and restart of at least one broker loses the non-persistent state of the at least one broker, and even when at least one link in the network fails and its connection is re-established, causing at least one message transmitted over the at least one link to be dropped, duplicated, or delivered out of order. That is, different subscribers on behalf of the same principal will receive exactly the same sequence of messages (modulo subscription filter differences), even when they are connected at different sub-networks in the system and even when their sub-networks may experience different communication latency and network or routing broker failures.

The plurality of brokers may be configured to eliminate a need for persistent storage of access control state at brokers other than the PHBs. A PHB may be configured to persistently store the control version identifier associated with the latest access control policy. A PHB may be configured to persistently store access control version identifiers associated with access control policies that were in effect at the time a message was published. Multiple paths may exist between a PHB and SHB, and IBs on different paths need not maintain identical access control state. At least a portion of the IBs may maintain access control version vectors, with one version per SHB, rather than maintaining access control rules. Each SHB may maintain the latest access control rules for principals that are connected thereto.

An SHB may subscribe to access control rule changes for principals connected thereto. IBs may filter access control rule changes by principal. Reliable delivery may be used to ensure that access control rule changes are received by the SHBs that need them. An SHB that accepts a connection from a new principal may use a request-response protocol to initialize the access control rules for that principal.

An SHB may intersect subscriptions with the latest access control rules and assign and maintain the control versions of the intersected subscriptions using the version of the control rules. The SHB may propagate the resulting subscription with the access control version identifier to upstream IBs. IBs may maintain subscription state with access control version identifiers.

PHBs may include the access control version identifier in data messages. IBs may use subscription state to filter the message if the access control version identifier in the data message is no more than the access control version number in the subscription state, and otherwise send the message downstream. An SHB may check equality of the control version identifier of the intersected subscriptions that match a message with the control version of the message to enforce subscribing access control rules.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Illustrative embodiments of the present invention will be described below in conjunction with an illustrative content-based publish/subscribe system including a plurality of broker devices or brokers which are preferably connected together to form an overlay network, although alternative connection arrangements are contemplated by the invention. The plurality of brokers are responsible for delivery of one or more messages sent by publishers to subscribers based, at least in part, on the content of these messages and/or on filtering predicates requested by the subscriber.

The brokers may be grouped according to certain functions. For example, one or more of the brokers may preferably be specialized for hosting publishers. These brokers may be referred to herein as publisher hosting brokers or PHBs. Furthermore, one or more of the brokers may preferably be specialized for hosting subscribers. These brokers may be referred to herein as subscriber hosting brokers or SHBs. Between the PHBs and SHBs, there may exist any number of intermediate hops that include routing and/or filtering. The brokers at such hops may be referred to herein as intermediate brokers or IBs. For ease of explanation, it will be assumed that each of the different brokers are separate entities. In an actual implementation, however, it is contemplated that any one broker may be capable of performing the functions of one or more PHBs, SHBs and IBs.

Before describing illustrative embodiments of an access control service model and an access control policy distribution and message delivery protocol of the invention, an illustrative content-based pub/sub system in which such model and protocol may be implemented will be described in the context of FIGS. 1A, 1B, and 2. Such content-based pub/sub system is described in detail in the U.S. patent application identified as Ser. No. 10/177,474, filed on Jun. 21, 2002, and entitled "Gapless Delivery and Durable Subscriptions in a Content-Based Publish/Subscribe System," the disclosure of which is incorporated by reference herein. It is to be understood, however, that the access control techniques of the invention are not limited to this illustrative system.

Figure 1A:
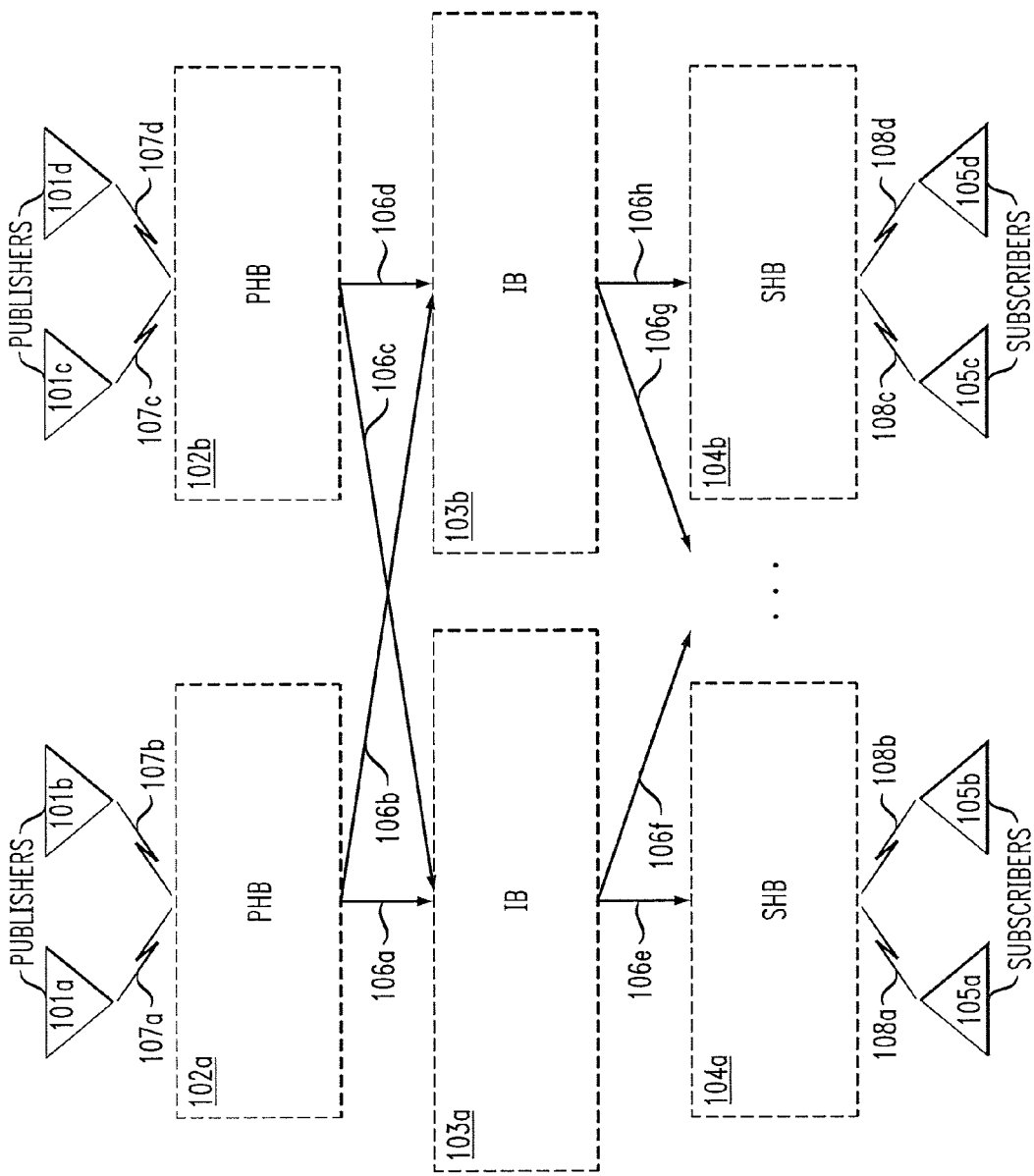
FIG. 1A is a block diagram illustrating at least a portion of a content-based publish/subscribe system including an exemplary network of brokers, according to one embodiment of the invention.

FIG. 1A illustrates at least a portion of a content-based pub/sub system including an exemplary network of brokers, formed in accordance with one aspect of the invention. Publishers 101a, 101b, 101c and 101d preferably establish connections to particular PHBs, 102a and 102b, over corresponding client connections 107a, 107b, 107c and 107d, respectively. The client connections may generally be any type of communication medium for conveying transmitted information, including a wireless communication link, such as, for example, infrared, radio frequency, satellite, microwave, etc., and a dedicated communication connection, such as, for example, telephone, cable, fiber optic, etc. Preferably, each of the client connections are a reliable, first-in-first-out (FIFO) connection, such as, but not limited to, a Transport Control Protocol/Internet Protocol (TCP/IP) socket connection.

Independently, subscribers 105a, 105b, 105c and 105d preferably establish connections to SHBs, 104a and 104b, over corresponding client connections 108a, 108b, 108c and 108d, respectively. Client connections 108a, 108b, 108c and 108d are preferably consistent with client connections 107a, 107b, 107c and 107d previously described. The PHBs, 102a, 102b, and SHBs, 104a, 104b, may be connected to IBs, 103a and 103b, via broker-to-broker connections 106a, 106b, 106c, 106d, 106e, 106f, 106g and 106h. Assuming the network employs a gapless delivery protocol and connection failures and message reordering is tolerated, it is not necessary for the broker-to-broker connections to use reliable FIFO protocols such as TCP/IP, but may advantageously use faster, less reliable protocols, thereby increasing system throughput.

Figure 1B:
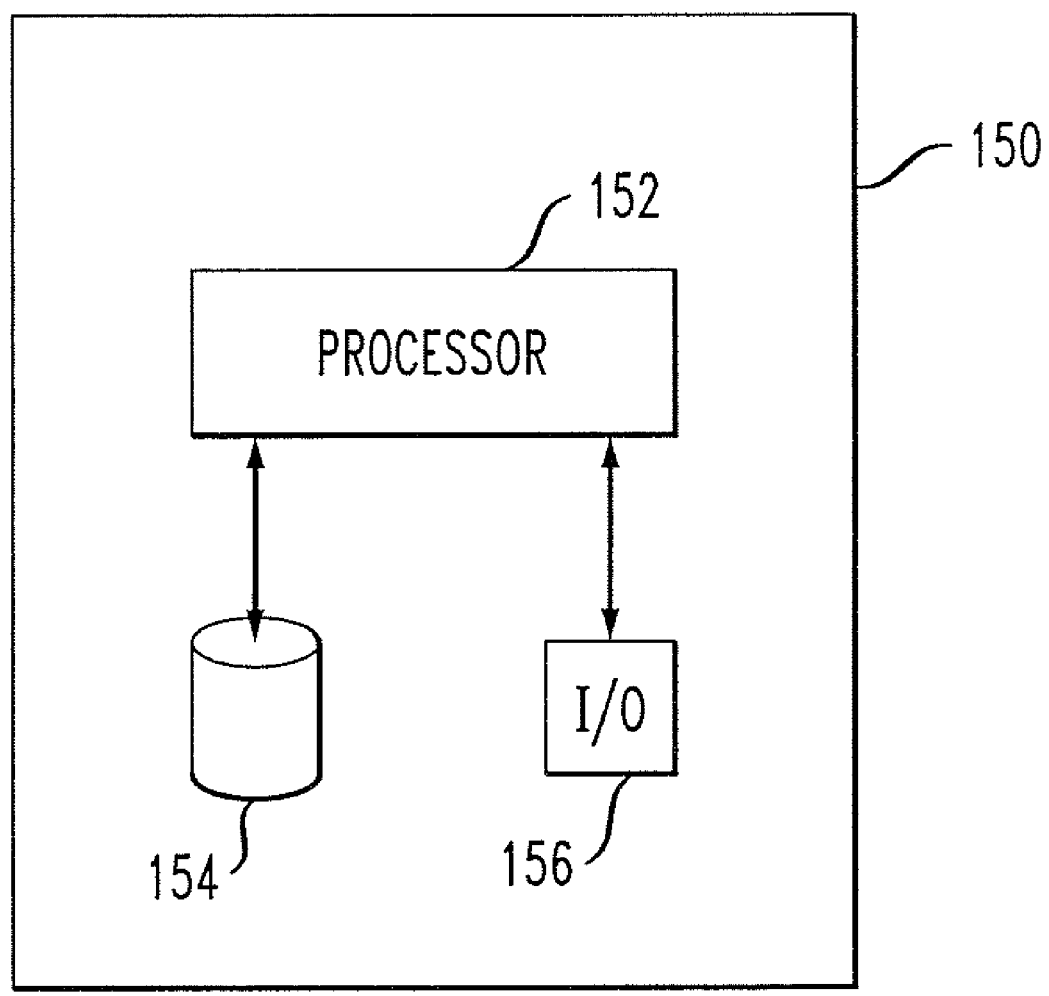
FIG. 1B is a block diagram illustrating a computing architecture for one or more components of a content-based publish/subscribe system, according to one embodiment of the invention.

As shown in FIG. 1B, each publisher, subscriber and broker (denoted as 150) may be implemented in accordance with a processor 152, memory 154 and one or more input/output (I/O) devices 156. It is to be appreciated that the term "processor" as used herein is intended to include any processing device, such as, for example, one that includes a central processing unit (CPU) and/or other processing circuitry (e.g., microprocessor). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "input/output devices" or "I/O devices" as used herein is intended to include, for example, one or more input devices (e.g., keyboard, mouse, network interface card, etc.) for entering data to the processor, and/or one or more output devices (e.g., printer, monitor, network interface card, etc.) for presenting the results associated with the processor.

Accordingly, an application program, or software components thereof, including instructions or code for performing the methodologies of the invention, as will be further described herein, may be stored in one or more of the associated storage media (e.g., ROM, fixed or removable storage) and, when ready to be utilized, loaded in whole or in part (e.g., into RAM) and executed by the processor 152. Thus, each publisher, subscriber, and broker may be, for example, either a standalone computer, a process or application running on a computer, or, to minimize delay due to system failures, a cluster of redundant processes running in a distributed manner within multiple computers.

Figure 2:
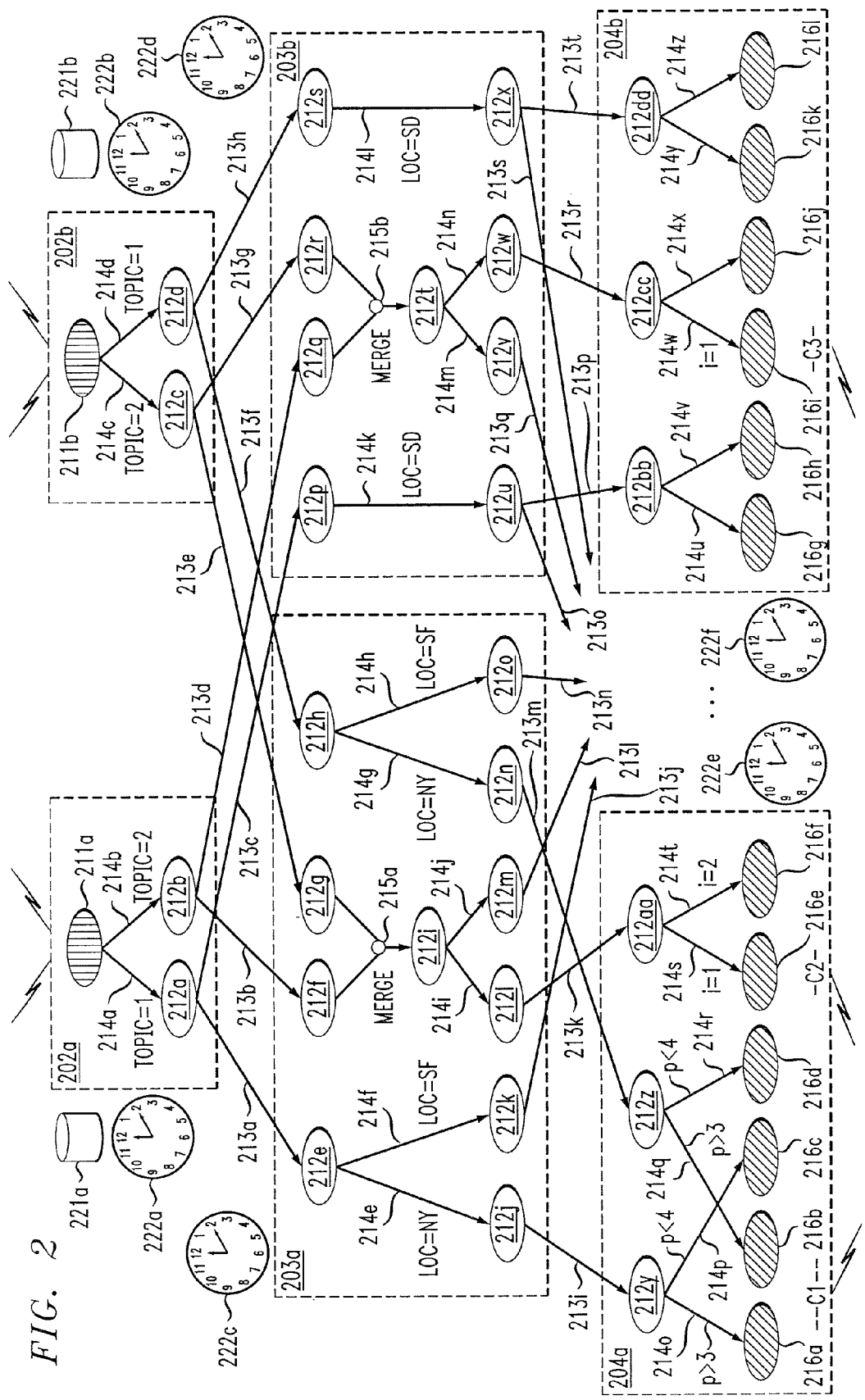
FIG. 2 is an information flow diagram illustrating an implementation of a broker network, according to one embodiment of the invention.

With reference now to FIG. 2, there is shown an exemplary information flow diagram illustrating an implementation of the broker network, in accordance with one aspect of the present invention. As apparent from the figure, the illustrative information flow diagram for the broker network comprises a plurality of nodes (depicted as ovals), referred to herein as information streams, and edges or paths (depicted as arrows between a source oval and a destination oval), referred to herein as transforms. The information flow diagram may be constructed by a system administrator, either statically or in response to subscription requests. The information flow diagram defines paths between source information streams 211a and 211b, referred to herein as pubends, and destination information streams 216a, 216b, 216c, 216d, 216e, 216f, 216g, 216h, 216i, 216j, 216k, 216l (collectively, 216), referred to herein as subends, via intermediate information streams 212a, 212b, 212c, 212d, 212e, 212f, 212g, 212h, 212i, 212j, 212k, 212l, 212m, 212n, 212o, 212p, 212q, 212r, 212s, 212t, 212u, 212v, 212w, 212x, 212y, 212z, 212aa, 212bb, 212cc, 212dd (collectively, 212).

Preferably, each publisher delivers messages to exactly one pubend, while each subscriber receives messages from one or more subends within a single SHB. Each transform is either a filter transform 214a, 214b, 214c, 214d, 214e, 214f, 214g, 214h, 214i, 214j, 214k, 214l, 214m, 214n, 214o, 214p, 214q, 214r, 214s, 214t, 214u, 214v, 214w, 214x, 214y, 214z (collectively, 214), a link transform 213a, 213b, 213c, 213d, 213e, 213f, 213g, 213h, 213i, 213j, 213k, 213l, 213m, 213n, 213o, 213p, 213q, 213r, 213s (collectively, 213), or a merge transform 215a, 215b. Information can be delayed, lost, or reordered while passing through a given transform, although in practice this will typically only occur over links.

Filters preferably include a predicate denoting a content filter. For example, filter 214e specifies that only messages having content matching "Loc=NY" will pass. A filter having no predicate associated therewith (e.g., 214i and 214j) passes all content, and is essentially equivalent to a link.

Each broker 202a, 202b, 203a, 203b, 204a, 204b preferably has a timer or clock 222a, 222b, 222c, 222d, 222e, 222f, respectively, associated therewith. Although the methodologies of the present invention do not require that these clocks be synchronized to real time, performance may be improved if these clocks are at least approximately accurate, or synchronized with respect to one another. In addition to having a clock associated with a particular broker, PHBs 202a and 202b require a stable storage medium 221a and 221b, respectively, associated therewith. Stable storage is intended to include nonvolatile memory, such as, for example, RAM, fixed storage, removable storage, etc. The remaining brokers (e.g., SHBs and IBs) 203a, 203b, 204a, 204b do not require stable storage, but may instead use "soft" state. The ability to only require stable storage in PHBs, and to allow SHBs and IBs to utilize soft state, advantageously distinguishes the present broker network from other protocols which employ store-and-forward techniques. These conventional protocols generally require stable storage associated with each broker in the network.

The path(s) from pubends to a given client's subend(s) determine which messages that client is guaranteed to receive. Specifically, each path propagates messages satisfying a conjunction (i.e., logical AND) of the predicates corresponding to each filter along the path. If there are multiple paths associated with a given node, that node receives messages that satisfy a disjunction (i.e., logical OR) of the path filters.

By way of example only, consider a client C1, which is associated with subends 216a and 216b. Based on the paths, namely, 214o, 213i, 214e, 213a and 214a, between subend 216a and a pubend, C1 will receive messages published to pubend 211a that satisfy the filters "Topic=1" & "Loc=NY" & "p>3," where the symbol "&" represents a logical AND operation. Likewise, based on the paths, namely, 214q, 213m, 214g, 213f and 214d, between subend 216b and a pubend, C1 will receive messages published to pubend 211b that satisfy the filters "Topic=1" & "Loc=NY" & "p>3."

Each subend is preferably an ordered stream. Therefore, client C1 will receive all relevant messages from pubend 211a (i.e., those messages having content which satisfy the filters associated with the given paths) in the order they were published, and all relevant messages from pubend 211b in the order they were published. However, between a message published to pubend 211*a* and another message published to pubend 21*lb* there is no necessary order. This implies that, irrespective of publish times, it is generally unpredictable whether a given message from pubend 211*a* will arrive before or after a given message from pubend 211*b*. This is an example of a client subscription with content selection (e.g., Topic=1& Loc=NY & p>3) and publisher order.

In contrast, consider client C2, which is associated with a single subend 216*e*. As shown in FIG. 2, the paths, namely, 214*s*, 213*k*, 214*i*, 215*a*, 213*b*, 214*b*, 213*e* and 214*c* between subend 216*e* and a pubend are the merge of filter "Topic=2" from pubend 211*a* and filter "Topic=2" from pubend 211*b*, further filtered by "i=1." Since client C2 has a single subend associated therewith, it receives a single ordered stream. This is an example of a client subscription with content selection (e.g., Topic=2 & i=1) and total order. Notice, that client C3 has a subscription with the same content selection (e.g., Topic=2 & i=1) and total order, and will therefore receive the same messages in the same order as client C2. This uniform total order property of the present broker network is a consequence of the fact that the merge transform is deterministic, meaning that two merge transforms receiving identical input information streams will produce the same merged output information stream.

The illustrative information flow diagram of FIG. 2 directs the gapless delivery methodologies of the present pub/sub system. In summary, each information stream preferably keeps track of what has occurred during each particular interval of time or tick. Thus, each information stream preferably comprises a data message (or a silence) and a curiosity representing how eager it is to learn about that tick. Knowledge flows downstream (i.e., in the direction of the arrows), while curiosity flows upstream (i.e., in a direction counter to the direction of the arrows). Accordingly, subends deliver messages when they detect that a gapless sequence of knowledge ticks has been extended. Pubends, on the other hand, log messages in stable storage. These logs maintained in stable storage may be subsequently utilized as arbiters of curiosity if no other broker has knowledge about what happened during a given tick.

Given the above description of an illustrative content-based pub/sub system, access control principles of the invention will now be illustratively described.

Principles of the invention realize that a publish/subscribe system should be able to continue functioning without having to shut down to enact new access control policies, as is often required by mission critical applications such as electronic-trading in financial markets.

Accordingly, illustrative embodiments of the invention provide dynamic access control in a pub/sub system with content-based filtering and routing, reliable delivery and redundant routes. To this end, a deterministic service model is provided for dynamic access control in a content-based pub/sub system. The deterministic guarantee of such a service model enables precise control over event confidentiality and is independent of issues like client locations, network latency and failures. The administrator has knowledge of the exact point in time in a published message stream when an access control change takes place. The semantics of reliable delivery under this model is clearly defined, that is, two or more subscribers of the same principal will receive the same set of messages when the access control policy of the principal is changed, no matter where the subscribers are connected.

It is to be understood that a "principal," as used herein, generally refers to an entity. Such entity can be positively identified and verified through an authentication technique. A principal is granted certain rights to use the resource or service of the system. Actual clients of the system can act on behalf of a principal and use the resource/service of the system. When the system is servicing a client, the system does so according to the rights granted to the principal on behalf of which the client connects. Examples of types of principals will be explained below.

Illustrative embodiments of the invention also provide an algorithm supporting this deterministic service model. Using this algorithm, access control changes are performed uniformly across all brokers to which the affected principals connect. There is no need for the system to obtain consensus from these brokers, which could compromise the efficiency of the system and timeliness of enacting the change. The algorithm is: (1) efficient in that it allows access control enforcement to be distributed across the network and performed close to event sources; and (2) highly available by allowing routing to choose any redundant paths without requiring consensus among these paths.

A. Service Model

In this section, a deterministic service model of dynamic access control is illustratively described. More particularly, we describe the various entities involved in dynamic access control and their roles, a content-based form for specifying access control rules and the clear starting points of access control changes.

In the illustrative service model, there are two types of entities that are involved in access control:

(1) Security administrator. The security administrator is the ultimate authority of access control in the system. The security administrator decides (based on external factors such as client service contracts) the access rights for client principals (defined below) and/or whether there should be any change to their existing access rights. The security administrator instructs the system of his/her decisions through an administrative interface.

In a large system, there may be multiple security administrators. As the changes made by each administrator may affect overlapping sets of clients, the system accepts the changes in a transactional and serializable manner. For the purpose of this illustrative description and simplicity of discussion, we consider the security administrators as a single entity that initiates a single sequence of policy changes. We assume that policy changes from different administrators are ordered and conflicts in changes are resolved.

(2) Client principals. Clients in the illustrative pub/sub system have associated principals which are decided/verified by the system through authentication when clients connect. It is to be understood that the term "client" as illustratively used herein may refer to either a publisher (i.e., a publishing client) or a subscriber (i.e., a subscribing client). In fact, a client can act as both a publisher and a subscriber. That is, a client can connect to the system, publish messages or subscribe and receive messages. The client's capability to connect, publish and subscribe/receive messages is regulated by the access rights of its principal. For example, if a client is interested in receiving stock quotes, financial news and reports of IBM Corporation but its principal has only access rights to stock quotes, the client will not receive any news and reports even though it requests them.

The access control rules in the illustrative system are associated with principals. Multiple clients of the same principal can connect at different places in the system.

There are two types of principals in the illustrative system: (1) group; and (2) individual. A group principal is a collection of individuals or recursively, other group principals. Access rights granted to a group principal are automatically granted to all members of the group, and recursively to the members of a member group.

The access rights of a principal include the right to connect, the right to publish and the right to subscribe to and receive messages. We adopt a content-based form for specifying access control rules of these three rights. An access control rule takes the following form of a tuple of three elements:

[Principal, Access type, Content filter]

A rule of such form specifies that a principal has the right to connect to the system, publish or subscribe to messages matching a content filter. While publish and subscribe rules can take a non-trivial filter, connect rules are specified with true or false to indicate the right to connect or not. For example, the rules that allow a principal "John Doe" to connect and subscribe to stock quotes are specified as follows:

[John Doe, Connect, True]

[John Doe, Subscribe, type='quote']

The access control rules are maintained internally in positive forms in that all rules specify what a principal is allowed to do. Negative forms specifying what a principal is not allowed to do are provided as a convenience to security administrators and are converted internally to positive forms by taking the negation of the content filters.

Under the regulation of access control rules, a client is allowed to publish messages that match the publish rules of its principal and is allowed to receive messages that match both its subscription filters and the subscribing rules of its principal. This allows the system to provide: (1) information authenticity by allowing only authorized sources to publish messages; (2) information confidentiality by only distributing messages to authorized subscribers; (3) protection against denial-of-service (DoS) attack initiated by malicious subscribers who request large number of messages that are only going to be discarded. This large number of messages can result in congestion in the network and impair the system's capability to serve other clients.

Group and individual principals share the same form of connect, publish and subscribe access rights. In addition, a new type of rule, referred to as member list, exists for group principals. For example, a premium subscribers group that includes Jane Smith and James Brown and has subscribing rights to all stock quotes, news and reports has the following access control rules:

[Premium group, Member list, {Jane Smith, James Brown}]

[Premium group, Subscribe, type='quote' or type='news' or type='report']

All members in a group are automatically granted the access rights of the group. Thus, the access rights of an individual principal are the union of the individual's rights and the rights of all group principals to which it belongs. Hence, Jane Smith and James Brown will have access to all stock quotes, news and reports in addition to other access rights they are granted.

Figure 3:
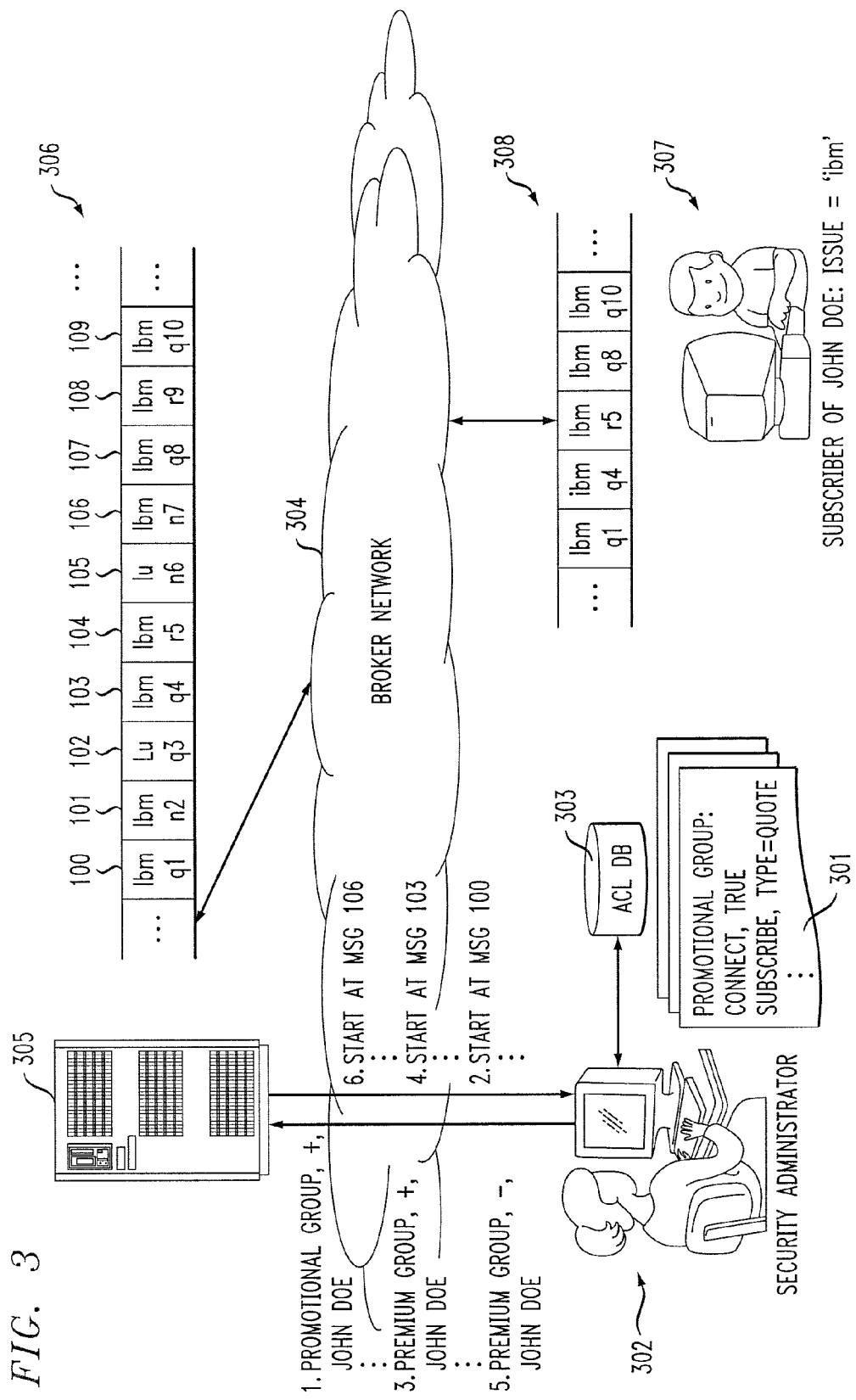
FIG. 3 is a block diagram illustrating an exemplary implementation of a service model, according to one embodiment of the invention.

FIG. 3 illustrates an example of the illustrative service model.

The illustrative deterministic service model provides clear starting points for access control changes. In this model, access control rules/changes 301 are initiated by a security administrator 302 at an administrative console and stored into a persistent storage 303 called ACL DB (access control database). At any time, the security administrator may specify a number of changes pertaining to one or more principals. These changes are considered as a batch that must be enforced atomically. After the security administrator confirms each batch of changes, the changes are propagated throughout broker network 304.

The brokers, to which publishers (not shown) connect, host one or more message streams. Each stream contains, in order, the messages published by one or more publishers. For example, as shown in FIG. 3, broker 305 hosts message stream 306.

For each of these streams, the broker picks a starting point to enact the new access control rules specified by the security administrator. The starting point is chosen in a way such that: (1) successive batches of changes get later starting points; and (2) the start point is late enough so that no messages after the starting point could have been delivered according to the old rule. This can be achieved by designating a newly published message on the stream as the starting point. The starting point information is sent back to the security administrator for future inquiries and references. The new rules are enforced uniformly throughout the system on all messages after the starting points, no matter where a principal's client connects.

Also shown in FIG. 3 is subscriber 307 receiving one or more messages 308 to which the subscriber subscribed, an example of which will be further explained below.

We illustrate the effect of an access control policy change using an example in which a principal John Doe's subscribing rights went through three phases of changes: (1) John Doe became a member of the promotional group which had subscribing access only to stock quotes; (2) John Doe became a premium subscriber and subsequently gained subscribing access to all three types of financial information (stock quotes, financial news and reports); and (3) John Doe's premium subscription expired and, as a result, lost subscribing rights to financial news and reports.

In relation to FIG. 3, it is assumed that a subscriber with principal John Doe connected to the system and requested a subscription of issue='ibm'. Under the service model, every time the access rights of John Doe change, the system provides a clear starting point in each message stream such that: (1) a message before the starting point is delivered to the client if and only if the message satisfies both the subscription filter and access right filter before the change; and (2) a message after the starting point is delivered to the client if and only if it satisfies both the subscription filter and access right filter after the change. In the stream in the example of FIG. 3, if the starting points chosen are message 100 for the first access change, message 103 for the second access change and message 106 for the third change, the messages delivered to the client will be 100, 103, 104, 107, 109. Notice that non-quotes are only delivered in the range 103 . . . 105. In a system that has more than one message stream, this activity happens to all streams, each with its individual start points.

The routing topology employed by the network of brokers is an abstract topology model of spanning trees of nodes where each node includes multiple virtual brokers that are redundant and can work interchangeably. Trees are noncyclic structures that simplify the task of loop-free routing. Tree nodes with redundant brokers provide high availability.

Recall from the illustrative pub/sub system described above in the context of FIG. 1 (in which the illustrative service model of the invention can be implemented) that we refer to a broker where publishers connect as a publisher hosting broker (PHB) and a broker where subscribers connect as a subscriber hosting broker (SHB). For simplicity, we will discuss routing from the standpoint of one PHB. The abstract network may be constructed such that any physical broker hosting clients implements a virtual broker in a leaf node. Hence, in this model, the SHBs only reside in the leaf nodes of the tree; and there is only one PHB and it resides in the root of the tree. The direction upstream/downstream points toward/away from the root. Because a client connects to one broker, each leaf node contains one broker. This topology model can represent a large range of practical topologies as one can transform a graph with redundant paths into a topology under this model by grouping brokers into tree nodes and inter-broker links into tree edges.

One illustrative implementation of access control is one in which the PHB and intermediate brokers forward all published messages that match client subscriptions to SHBs, and SHBs enforce access control by delivering messages that match not only a client's subscription but also its access rights. Such a solution will be a perfectly correct implementation, but it may waste considerable bandwidth sending messages that will be later discarded.

Subscription propagation is an optimization which may result in fewer wasted messages being sent to SHBs in exchange for requiring the PHB and intermediate brokers to acquire knowledge about subscription predicates and perform filtering. By propagating clients' access rights along with their subscriptions, further savings in communication cost may be achieved.

Providing the deterministic service guarantee described above is challenging in a content-based system deployed over a network with redundant paths. Due to content-based routing, gaps can not be detected by traditional methods such as publisher-assigned sequence numbers because each subscriber may request a completely unique sequence of messages to be delivered. Reliability in a content-based system hence requires brokers on the routing path to assist in gap detection.

Multiple paths, communication asynchrony and failures complicate the propagation of subscription and access control information as redundant brokers on alternative routes may have different subscription and access control information from each other. If messages from the same published stream are routed through those brokers, they are matched to different sets of subscription and access control filters. As a result, gaps can appear in the message sequences delivered to subscribers.

Illustrative protocols for subscription propagation are disclosed in Y. Zhao et al., "A General Algorithmic Model for Subscription Propagation and Content-based Routing with Delivery Guarantees," RC23669, IBM Research 2005, and Y. Zhao et al., "Subscription Propagation in Highly-available Publish/Subscribe Middleware," ACM/IFIP/USENIX 5$^{th}$ International Middleware Conference, 2005, the disclosures of which are incorporated by reference herein. These protocols preserve reliable delivery and enable free routing choices on any of the redundant paths for system availability and load sharing. Furthermore, such protocols provide that a subscription's reliable delivery starting point on a published message stream can be chosen as any point in the stream provided that none of the messages after the starting point has been acknowledged so that the system may have reclaimed the persistent storage occupied by the message.

Below, we use such reliable delivery and subscription propagation protocols as building blocks for constructing an efficient and highly available distributed protocol that enforces the deterministic semantics of dynamic access control to pub/sub clients. We adopt a domain-based trust model. All brokers within the same domains trust each other. Brokers that do not trust each other should be put into different domains and cross-domain communication is regulated by assigning access control rules according to their trust levels. For simplicity, we discuss the protocols under one trusted domain. This is of practical use as in many commercial cases, pub/sub systems are deployed in a managed environment under the complete control of an administrator. The concepts can be extended to multiple trusted domains by treating a domain as a publish/subscribing client and assigning a principal to the domain. The clients connected to the system through an un-trusted domain can only access messages that satisfy both the domain's right and their own access right.

B. Access Control Policy Distribution and Message Delivery Protocol

Figure 4:
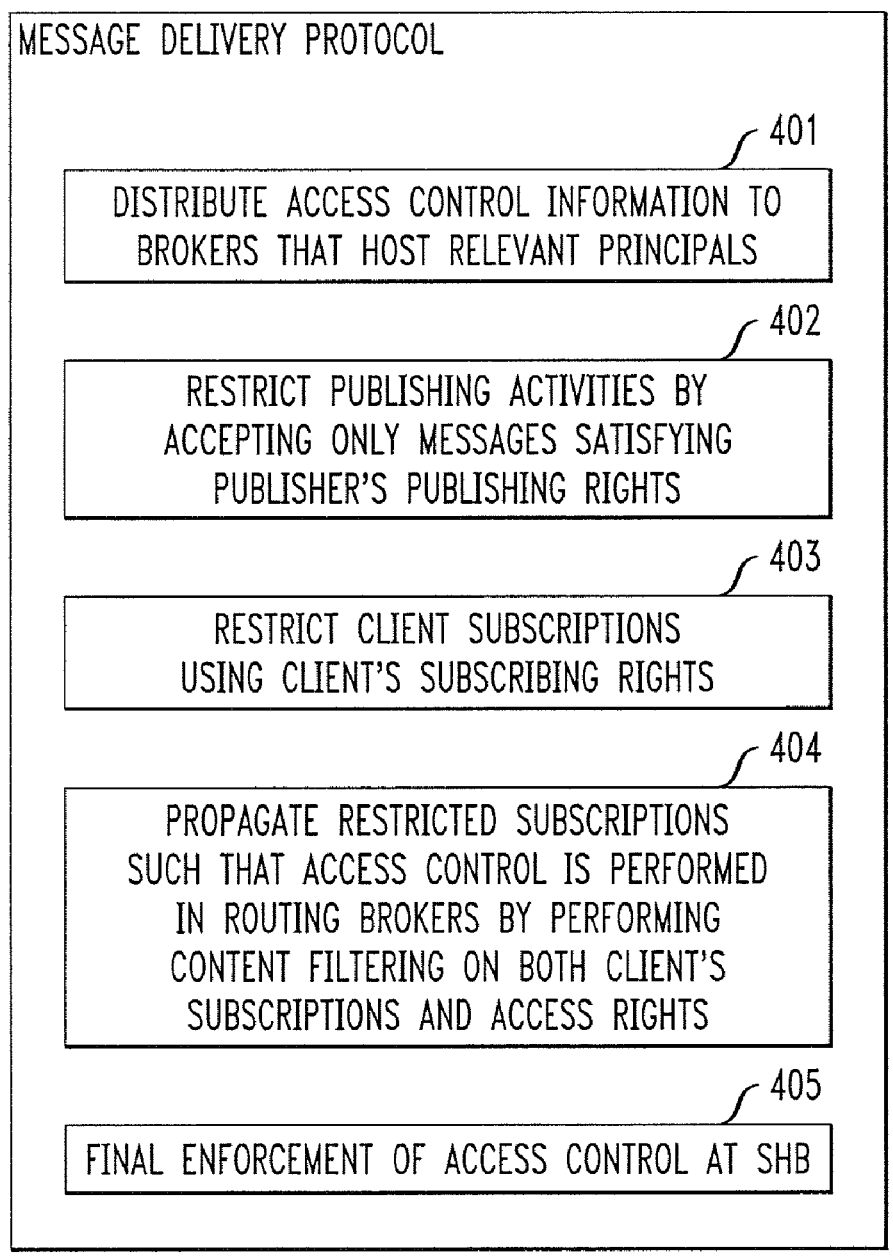
FIG. 4 is a flow diagram illustrating a summary of an access control policy distribution and message delivery protocol, according to one embodiment of the invention.

FIG. 4 illustrates an access control policy distribution and message delivery protocol that provides a deterministic service guarantee of message delivery. As outlined, the protocol provides for: distributing access control information to brokers that host relevant principals (401); restricting publishing activities by accepting only messages satisfying the publisher's publishing rights (402); restricting client subscriptions using their subscribing rights (403); propagating restricted subscriptions and hence enforcing access control in the routing brokers by performing content filtering on both the clients' subscriptions and access rights (404); and final enforcement of access control at the SHB (405). We describe each of these protocol aspects below with reference back to components illustrated in FIGS. 1A through 3.

As previously mentioned, access control policies are maintained in a persistent storage called ACL DB. The security administrator makes policy changes in transactional batches to the ACL DB. Access control policies are associated with a control version, which is an integer counter. Each transactional batch brings the ACL DB into a new control version. The new access control rules are assigned with the new version number. As old access control rules may still be in effect for some messages, the ACL DB contains a mixture of access control rules with different versions. To avoid sending the whole state, the ACL DB distributes the new version of access control by publishing it as an incremental change.

Each PHB/SHB maintains a cache of latest access control rules for clients that are currently connected. When a client with a new principal connects, the broker retrieves an initial version of access control rules for the principal through a request/reply protocol with the ACL DB. The broker also establishes a subscription for receiving future access control changes for the connected principal. The subscription propagation and reliable delivery service ensures that the broker receives every access control change after obtaining an initial version of access rules for a connected principal.

When a PHB receives a new version of access control rules, it updates its cache. The PHB picks a starting point for the new version as the next message that will be published. Newly published messages will only be accepted if they match the current publishing rights in effect. In addition, newly published messages are transmitted in the system carrying the access control version that is in effect. We now describe how subscribing rights are enforced.

In a system where content-based routing is purely based on client subscriptions and access control is only enforced at the broker where clients connect, the routing brokers may send messages that only match the client's subscriptions but not their access rights. These messages will only be discarded later and result in waste of system bandwidth.

We treat access control information as another type of information that can affect message routing in addition to client subscriptions. Thus, instead of propagating the original client subscription filters to the rest of the network, the SHBs propagate a restricted form of filters that are the intersection of the client subscription filter and the latest version of content-based access rules in the SHBs cache. When the access control rules change, the SHB re-computes the restricted subscriptions for all affected clients/principals with the new version of rules. The resulting subscriptions are propagated upstream atomically together with the control version. The upstream routing brokers handle the subscriptions without having to know whether the subscriptions are restricted. The upstream routing broker only needs to maintain a vector of control versions for each SHB in its downstream.

As we propagate restricted filters, content-based routing is based on the intersection of client subscription filters and access control rules. This allows the routing brokers to participate in access control as well as the SHBs.

As mentioned above, a message in the system carries the control version that is in effect for the message. When routing the message for a downstream, a routing broker compares this version of the message with the subportion of its control version vector for SHBs located in that downstream. The message is only filtered out if it does not match the restricted subscriptions from the downstream and every element of the sub-portion of the broker's control version vector is no less than that of the message. In the case that the broker does not have a sufficiently large control version vector, the broker may conservatively send the message to the downstream. For example, a broker b sends the message to a downstream broker anyway, even though the message may be wasteful, i.e., does not match the subscription filter and the subscribing rights of any client connected at the sub-network rooted at the downstream broker. If the broker b had a sufficiently large control version vector, the broker b may be able to filter out and withhold from sending a message to a downstream broker b' if the message does not match any subscription filter it (broker b) maintains for a sub-network rooted at the downstream broker b'.

The ultimate enforcer of access control is the SHBs, as intermediate routing brokers may conservatively send messages that do not match a client's accessing right.

The SHB first examines whether it has received the access control rules of the version required by the message. If not, the SHB delays the processing of the message until the version of the access control rules arrives. If the SHB receives the control version of rules, the SHB examines each restricted subscription that matches the message. If the restricted subscription has the same control version as the message, the message is delivered to the subscribing client. Otherwise, the message is not delivered to the client.

The use of control versions not only allows the message delivery algorithm to implement the clear starting point feature of the service model, but also allows the system to be more asynchronous and fault tolerant. The distribution of access control changes with a control version number allows each broker in the system to proceed asynchronously instead of waiting for a slow or crashed broker if a transactional session of broadcasting to all brokers is utilized. Even in the case that a majority of brokers fail in a routing tree node, new access control rules can be enacted and the remaining broker can participate in enforcing access control without having to obtain an agreement from its redundant peers. When a broker recovers, even when its control version may lag behind, the broker can still participate in message routing, utilizing its part of the network capacity that would otherwise stay idle.

The use of a control rule cache of only connected principals allows the system to scale even in the large scale environment where the number of principals is large. The SHBs only need to know access control rules for the principals that are locally connected.

Figure 5A:
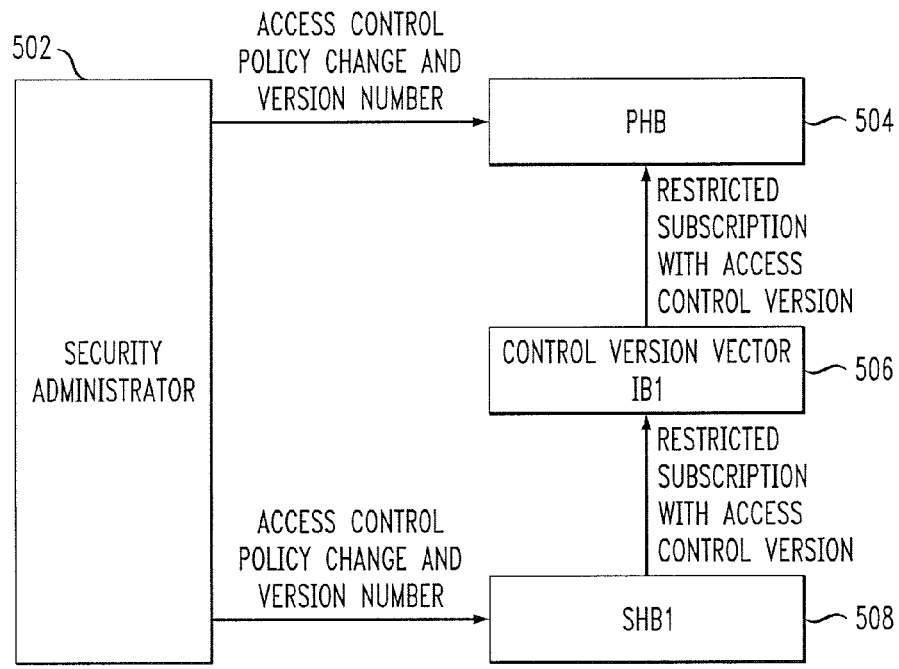
FIGS. 5A and 5B are block diagrams illustrating a portion of a content-based publish/subscribe system implementing an access control policy distribution and message delivery protocol, according to one embodiment of the invention.
Figure 5B:
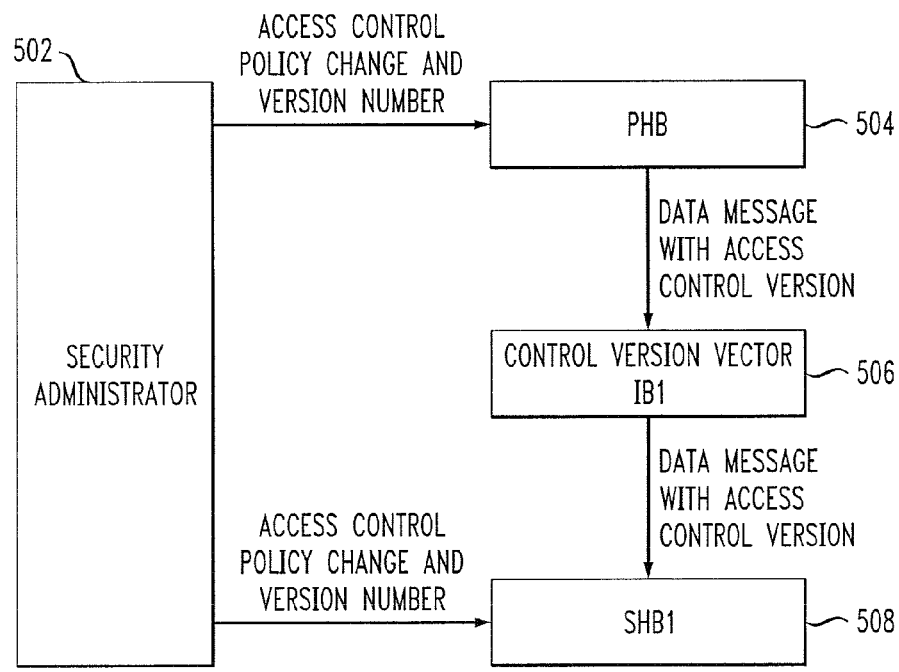

Referring now to FIGS. 5A and 5B, a portion of a content-based publish/subscribe system implementing an access control policy distribution and message delivery protocol, according to one embodiment of the invention, is shown. It is to be understood that, in the illustrated example, only one security administrator, one PHB, one IB, and one SHB are shown for simplicity purposes. Thus, actual systems will involve multiple such components. Further, a PHB may be coupled to an SHB directly, i.e., without having an IB therebetween. Also, it is to be understood that the security administrator, the PHB, the SHB and the IB refer to computing devices that perform the steps described. Such computing devices may be configured as illustrated in FIG. 1B, such that the steps/operations described can be executed via the processor and memory arrangement.

As shown, in this example, security administrator 502 sends a message including an access control policy change (i.e., batch of access control policy changes) with the assigned control version number, as explained above, to appropriate brokers. Appropriate brokers would be any brokers that host a client on behalf of a principal affected by the policy change. In this example, appropriate brokers are shown as PHB (504) and SHB1 (508).

As explained above, and as illustrated in FIG. 5A, when the access control rules change, the SHB re-computes the restricted subscriptions for all affected clients/principals with the new version of rules. The resulting subscriptions are propagated upstream atomically together with the control version. The upstream routing brokers (IB 506 in this example) handle the subscriptions without having to know whether the subscriptions are restricted. The upstream routing broker only needs to maintain a vector of control versions for each SHB in its downstream.

Further, as explained above, and as illustrated in FIG. 5B, when a PHB receives a new version of access control rules, it updates its cache. The PHB picks a starting point for the new version as the next message that will be published. The newly published messages are transmitted by the PHB (504) in the system carrying the access control version that is in effect.

Figure 6A:
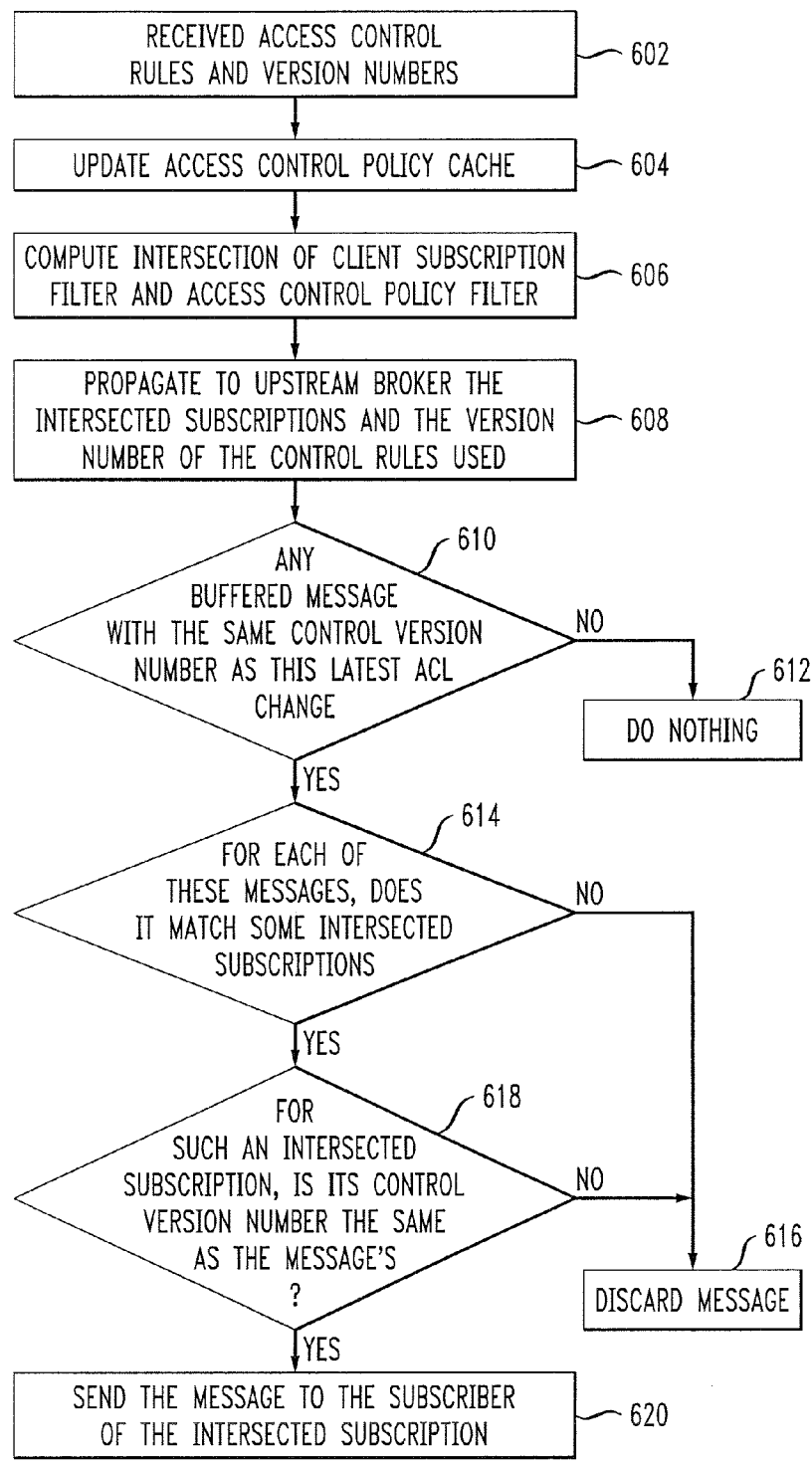
FIGS. 6A through 6E are flow diagrams illustrating an access control policy distribution and message delivery protocol, according to one embodiment of the invention.
Figure 6B:
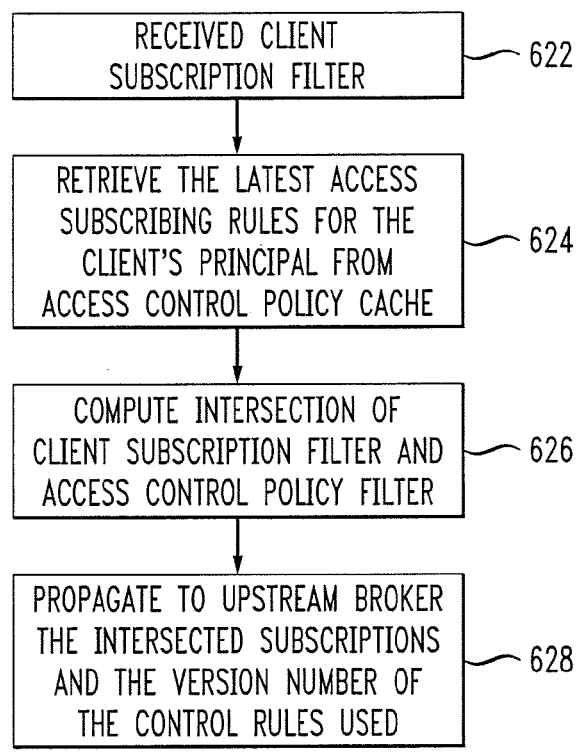
Figure 6C:
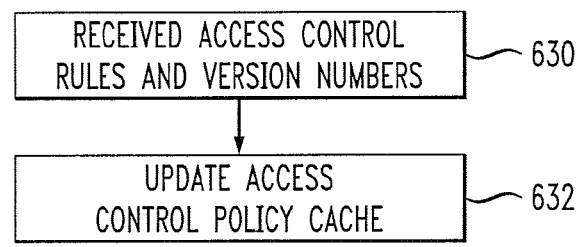
Figure 6D:
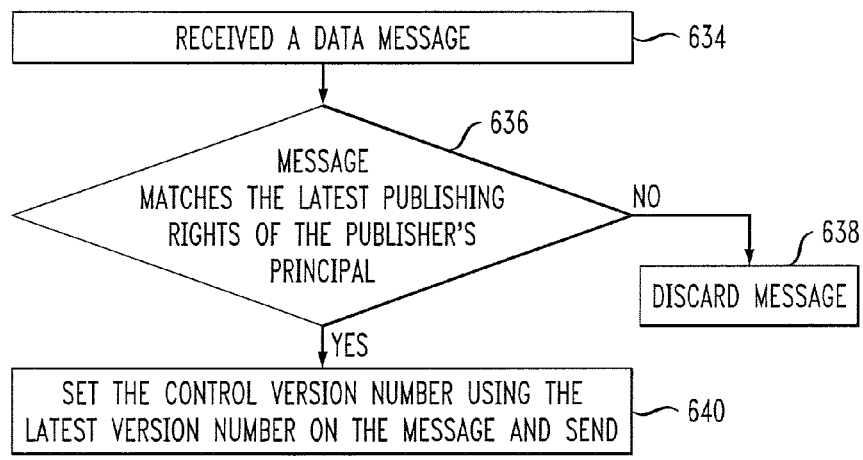
Figure 6E:
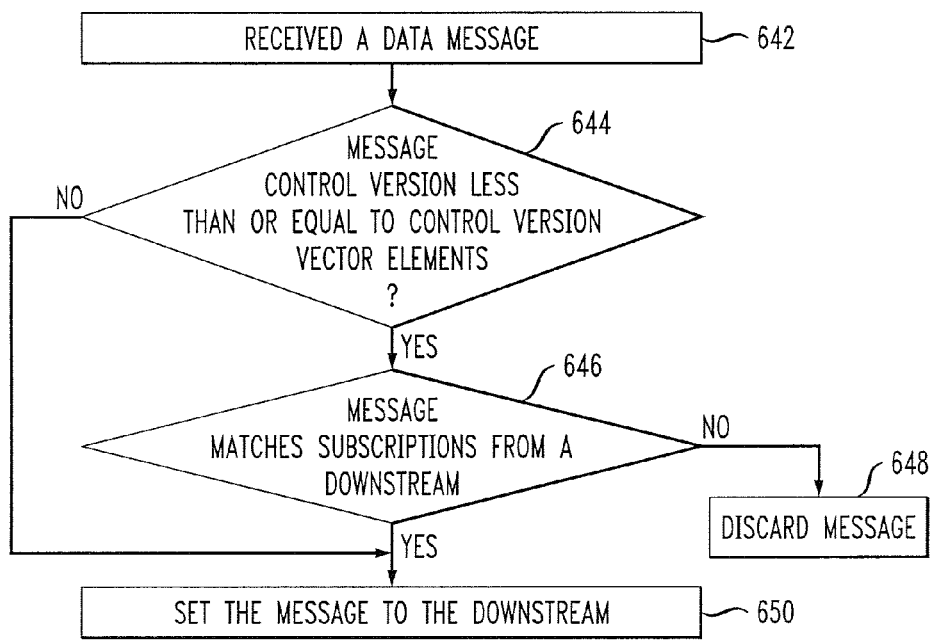

Referring now to FIGS. 6A through 6E, flow charts illustrate steps taken, in the access control policy distribution and message delivery protocol, by an SHB (FIGS. 6A and 6B), a PHB (steps 6C and 6D), and an IB (FIG. 6E). These flow charts illustrate examples of aspects of the access control policy distribution and message delivery protocol explained above.

FIG. 6A illustrates processing performed by the SHB upon receiving information on a new version of access control.

In step 602, the SHB receives access control rules and version numbers.

In step 604, the SHB updates its access control policy cache.

In step 606, the SHB computes the intersection of the client subscription filter and the access control policy filter.

In step 608, the SHB propagates to the upstream broker(s) the intersected subscriptions and the version number of the control rules used.

In step 610, the SHB checks whether there are any buffered messages with the same control version number as this latest ACL change.

If "no" in step 610, the SHB does nothing more with respect thereto (block 612).

If "yes" in step 610, the SHB checks, for each of these messages, whether it matches some intersected subscriptions (step 614).

If "no" in step 614, the SHB discards the message (step 616).

If "yes" in step 614, the SHB checks, for such an intersected subscription, whether its control version number is the same as that of the message (step 618).

If "no" in step 618, the SHB discards the message (step 616).

If "yes" in step 618, the SHB sends the message to the subscriber of the intersected subscription (step 620).

FIG. 6B illustrates processing performed by the SHB upon receiving a new client subscription.

In step 622, the SHB receives the client subscription filter.

In step 624, the SHB retrieves the latest access subscribing rules for the principal of the client from the access control policy cache.

In step 626, the SHB computes the intersection of the client subscription filter and the access control policy filter.

In step 628, the SHB propagates to the upstream broker(s) the intersected subscriptions and the version number of the control rules used.

FIG. 6C illustrates processing performed by the PHB upon receiving information on a new version of access control.

In step 630, the PHB receives the access control rules and the version numbers.

In step 632, the PHB updates its access control policy cache.

FIG. 6D illustrates processing performed by the PHB upon receiving a new data message.

In step 634, the PHB receives a data message.

In step 636, the PHB checks whether the message matches the latest publishing rights of the principal of the publisher.

If "no" in step 636, the PHB discards the message (step 638).

If "yes" in step 636, the PHB sets the control version number using the latest version number on the message and sends the message (step 640).

FIG. 6E illustrates processing performed by the IB upon receiving a data message.

In step 642, the IB receives a data message.

In step 644, the IB checks whether the message control version is less than or equal to the control version vector elements of the IB.

If "yes" in step 644, the IB checks whether the message matches the subscriptions from the downstream (step 646).

If "no" in step 646, the IB discards the message (step 648).

If "no" in step 644 or "yes" in step 646, the IB sends the message to the downstream (step 650).

It is to be understood that the above processing steps are intended to be illustrative in nature and, thus, an access control policy distribution and message delivery protocol of the invention may perform less or more processing steps, other processing steps, and/or the above processing steps in a different order.

Advantageously, as illustrated herein, a service model according to illustrative embodiments of the invention is able to substantially guarantee deterministic and uniform access control semantics to all subscribers on behalf of the same principals in the system. This is the case even when a crash and restart of one or more brokers causes the one or more brokers to lose the non-persistent state of the access control policy in effect. This is also the case even when at least one link in the network fails and its connection is re-established, causing at least one message transmitted over the link to be dropped, duplicated, or delivered out of order. That is, different subscribers on behalf of the same principal will receive exactly the same sequence of messages (modulo subscription filter differences), even when they are connected at different sub-networks in the system and even when their sub-networks may experience different communication latency and network or routing broker failures.

Further, such a service model allows for the ability to enforce both publishing and subscribing access control using a content-based form that can be applied to content-based publish/subscribe system, as well as the ability for all brokers other than just the SHBs to participate in subscriber access control without having to maintain access control rules.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of providing access control in a content-based publish/subscribe system, wherein messages are delivered from publishing clients to subscribing clients via a plurality of brokers, the method comprising the steps of:

specifying one or more changes to an access control policy, wherein an access control policy specifies rights of clients to publish messages and to subscribe to and receive messages in the content-based publish/subscribe system;

associating an access control version identifier to the one or more changes, wherein control version identifier comprises a numerical counter;

sending the one or more changes to one or more brokers of the plurality of brokers that have a publishing client or a subscribing client associated therewith that is affected by the one or more changes; and sending the access control version identifier associated with the one or more changes to each of the plurality of brokers, wherein the plurality of brokers host one or more message streams, each of the one or more message streams comprising a series of messages published by one or more of the publishing clients; and wherein a given broker, upon receipt of the one or more changes, uses the access control version identifier to determine a starting point in a message stream hosted by the given broker such that (i) a message before the starting point in the message stream is delivered to a subscribing client when the message satisfies subscription and access rights before the change associated with the access control version identifier and (ii) a message after the starting point in the message stream is delivered to the subscribing client when the message satisfies the subscription and access rights after the change associated with the access control version identifier, wherein one or more of the steps of specifying, associating, and sending are implemented by a computer.

2. The method of claim 1, wherein each of the one or more changes to the existing access control policy are stored and implemented in the system as a batch, having the access control version identifier associated therewith, so as to uniquely identify the one or more changes from one or more previous changes to the existing access control policy of the system.

3. The method of claim 1, wherein each of the plurality of brokers is at least one of a publisher hosting broker (PHB), a subscriber hosting broker (SHB) and an intermediate broker (IB), and wherein the specifying, associating and sending steps are performed in accordance with a security administrator.

4. The method of claim 3, wherein the security administrator sends the one or more changes and the associated access control version identifier to PHBs and SHBs that have a publishing client or a subscribing client associated therewith that is affected by the one or more changes.

5. The method of claim 3, wherein an SHB, upon receipt of the one or more changes, computes a restricted subscription for an affected client.

6. The method of claim 5, wherein the SHB sends the restricted subscription along with the access control number to one or more other brokers.

7. The method of claim 3, wherein a PHB performs at least one of the steps of:
    upon receipt of the one or more changes, applying the one or more changes to the access control policy to obtain the latest publishing rights and the access control version identifier; and
    upon receipt of a data message to be published, applying the latest publishing rights to the message.

8. The method of claim 7, wherein the PHB sends the data message along with the access control number to one or more other brokers.

9. The method of claim 3, wherein an IB maintains a control version vector.

10. Apparatus for providing access control in a content-based publish/subscribe system, wherein messages are delivered from publishing clients to subscribing clients via a plurality of brokers, comprising:
    a memory; and
    at least one processor coupled to the memory and operative to: (i) specify one or more changes to an access control policy, wherein an access control policy specifies rights of clients to publish messages and to subscribe to and receive messages in the content-based publish/subscribe system; (ii) associate an access control version identifier to the one or more changes, wherein the access control version identifier comprises a numerical counter; (iii) send the one or more changes to one or more brokers of the plurality of brokers that have a publishing client or a subscribing client associated therewith that is affected by the one or more changes; and (iv) send the access control version identifier associated with the one or more changes to each of the plurality of brokers,
    wherein the plurality of brokers host one or more message streams, each of the one or more message streams comprising a series of messages published by one or more of the publishing clients; and
    wherein a given broker, upon receipt of the one or more changes, uses the access control version identifier to determine a starting point in a message stream hosted by the given broker such that (i) a message before the starting point in the message stream is delivered to a subscribing client when the message satisfies subscription and access rights before the change associated with the access control version identifier and (ii) a message after the starting point in the message stream is delivered to the subscribing client when the message satisfies the subscription and access rights after the change associated with the access control version identifier.

11. A content-based publish/subscribe system for providing message delivery from a publishing client to a subscribing client, the system comprising:
    a plurality of brokers operatively coupled to one another via a network, each of the brokers being configured as at least one of a publisher hosting broker (PHB), a subscriber hosting broker (SHB) and an intermediate broker (IB);
    at least one administrator being operatively coupled to at least a portion of the plurality of brokers, and being configured to store and update at least one access control policy within the system, wherein an access control, policy specifies rights of clients to publish messages and to subscribe to and receive messages in the content-based publish/subscribe system; and
    wherein at least a portion of the plurality of brokers and the at least one administrator are configured to implement a change to the access control policy within the system by including an access control version identifier with one or more messages sent therebetween, wherein the access control identifier comprises a numerical counter that uniquely identifies the access control policy that is in effect, such that the change in the access control policy deterministically and uniformly applies to publishing clients and subscribing clients associated with one or more principals affected by the change in the access control policy,
    wherein the plurality of brokers host one or more message streams, each of the one or more message streams comprising a series of messages published by one or more of the publishing clients; and
    wherein a given broker, upon receipt of the one or more changes, uses the access control version identifier to determine a starting point in a message stream hosted by the given broker such that (i) a message before the starting point in the message stream is delivered to a subscribing client when the message satisfies subscription and access rights before the change associated with the access control version identifier and (ii) a message after the starting point in the message stream is delivered to the subscribing client when the message satisfies the subscription and access rights after the change associated with the access control version identifier.

12. The system of claim 11, wherein the plurality of brokers are configured, to eliminate a need for persistent storage of access control state at brokers other than the PHBs.

13. The system of claim 11, wherein at least one PHB is configured to persistently store the control version identifier associated with the latest access control policy.

14. The system of claim 13, wherein at least one PHB is configured to persistently store access control version identifiers associated with access control policies that were in effect at the time a message was published.

15. The system of claim 11, wherein multiple paths exist between a PHB and SHB, and IBs on different paths need not maintain identical access control state.

16. The system of claim 11, wherein at least a portion of the IBs maintain access control version vectors, with one version per SHB, rather than maintaining access control rules.

17. The system of claim 11, wherein each SHB maintains the latest access control rules for principals that are connected thereto.

18. The system of claim 11, wherein: (i) an SHB subscribes to access control rule changes for principals connected thereto; (ii) IBs filter access control rule changes by principal, (iii) reliable delivery is used to ensure that access control rule changes are received by the SHBs that need them, and (iv) an SHB that accepts a connection from a new principal uses a request response protocol to initialize the access control rules for that principal.

19. The system of claim 18, wherein: (i) an SHB intersects subscriptions with the latest access control rules and assigns and maintains the control versions of the intersected subscriptions using the version of the control rules; (ii) the SHB propagates the resulting subscription with the access control version identifier to upstream IBs, and (iii) IBs maintain subscription state with access control version identifiers.

20. The system of claim 19, wherein: (i) PHBs include the access control version identifier in data messages, (ii) IBs use subscription state to filter the message if the access control version identifier in the data message is no more than the access control version number in the subscription state, and otherwise send the message downstream; (iii) an SHB checks equality of the control version identifier of the intersected subscriptions that match a message with the control version of the message to enforce subscribing access control rules.

* * * * *